(12) United States Patent
Yu et al.

(10) Patent No.: US 10,110,131 B2
(45) Date of Patent: Oct. 23, 2018

(54) CONTROL CIRCUIT FOR INTERLEAVED SWITCHING POWER SUPPLY

(71) Applicant: Silergy Semiconductor Technology (Hangzhou) LTD, Hangzhou, ZheJiang Province (CN)

(72) Inventors: Feng Yu, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 579 days.

(21) Appl. No.: 14/525,876

(22) Filed: Oct. 28, 2014

(65) Prior Publication Data

US 2015/0115917 A1 Apr. 30, 2015

(30) Foreign Application Priority Data

Oct. 29, 2013 (CN) .......................... 2013 1 0522881

(51) Int. Cl.
*H02M 3/158* (2006.01)

(52) U.S. Cl.
CPC .. *H02M 3/1584* (2013.01); *H02M 2003/1586* (2013.01)

(58) Field of Classification Search
CPC . G05F 1/445; G05F 1/455; G05F 1/66; G05F 1/56; G05F 1/575; G05F 1/563; G05F 1/577; G05F 1/59; G05F 1/465; G05F 1/565; G05F 1/595; G05F 1/573; G05F 1/569; G05F 1/5735; G05F 1/567;
(Continued)

(56) References Cited

U.S. PATENT DOCUMENTS

| 7,012,411 B2 | 3/2006 | Yasukouchi |
| 7,764,054 B1 * | 7/2010 | Guo ...................... H02M 3/156 323/224 |

(Continued)

FOREIGN PATENT DOCUMENTS

| CN | 101217255 A | 7/2008 |
| CN | 102707757 A | 10/2012 |

OTHER PUBLICATIONS

Bing Yuan, Implementaion of high stability with on-chip frequency compensation in a current mode DC-DC converter, Journal of XiDian University, Aug. 31, 2008, vol. 35, No. 4, Xi'An, China.

*Primary Examiner* — Jue Zhang
*Assistant Examiner* — Kevin H Sprenger
(74) *Attorney, Agent, or Firm* — Michael C. Stephens, Jr.

(57) ABSTRACT

In one embodiment, a control circuit configured for an interleaved switching power supply, can include: (i) a feedback compensation signal generation circuit configured to sample an output voltage of the interleaved switching power supply, and to generate a feedback compensation signal; (ii) a first switch control circuit configured to compare a voltage signal indicative of an inductor current in the first voltage regulation circuit against the feedback compensation signal, and to control a first main power switch in the first voltage regulation circuit; and (iii) a second switch control circuit configured to turn on a second main power switch in the second voltage regulation circuit after half of a switching cycle after the first main power switch is turned on, and to regulate an on time of the second main power switch.

17 Claims, 2 Drawing Sheets

(58) Field of Classification Search
CPC ........ H02M 3/07; H02M 3/073; H02M 3/156; H02M 3/1563; H02M 3/33561; H02M 3/158; H02M 3/155; H02M 3/1584; H02M 3/1588; H02M 3/1582; H02M 3/33507; H02M 3/33515; H02M 2001/007; H02M 2001/0045; H02M 2001/009; H02M 2001/0032; H02M 2001/0012; H02M 2001/0025; H02M 1/0845; H02M 1/44; H02M 5/293; Y02B 70/1466
USPC .................. 323/237, 241–243, 265–288
See application file for complete search history.

(56) References Cited

U.S. PATENT DOCUMENTS

| | | |
|---|---|---|
| 8,587,968 B2 | 11/2013 | Zhu et al. |
| 8,729,819 B2 | 5/2014 | Zhao et al. |
| 2002/0125869 A1* | 9/2002 | Groom ................ H02M 3/1584 323/283 |
| 2007/0013356 A1* | 1/2007 | Qiu ..................... H02M 3/1584 323/288 |
| 2008/0049478 A1* | 2/2008 | Wong ................... H02M 3/156 363/132 |
| 2009/0115383 A1* | 5/2009 | Benes ..................... G05F 1/46 323/280 |
| 2013/0148387 A1 | 6/2013 | Ren et al. |
| 2015/0067358 A1* | 3/2015 | Philbrick ............. H02M 3/158 713/300 |

* cited by examiner

CONTROL CIRCUIT FOR INTERLEAVED SWITCHING POWER SUPPLY

RELATED APPLICATIONS

This application claims the benefit of Chinese Patent Application No. 201310522881.9, filed on Oct. 29, 2013, which is incorporated herein by reference in its entirety.

FIELD OF THE INVENTION

The present invention relates to a switch mode power supply, and more particularly to a control circuit for an interleaved switching power supply.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a control circuit configured for an interleaved switching power supply, can include: (i) a feedback compensation signal generation circuit configured to sample an output voltage of the interleaved switching power supply, and to generate a feedback compensation signal; (ii) a first switch control circuit configured to compare a voltage signal indicative of an inductor current in the first voltage regulation circuit against the feedback compensation signal, and to turn on a first main power switch in the first voltage regulation circuit, and then to turn off the first main power switch after a predetermined time, in response to the voltage signal being equal to the feedback compensation signal; and (iii) a second switch control circuit configured to turn on a second main power switch in the second voltage regulation circuit after half of a switching cycle after the first main power switch is turned on, and to regulate an on time of the second main power switch in response to a comparison of inductor current average values of inductor currents of the two voltage regulation circuits in the switching cycle.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. For example, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
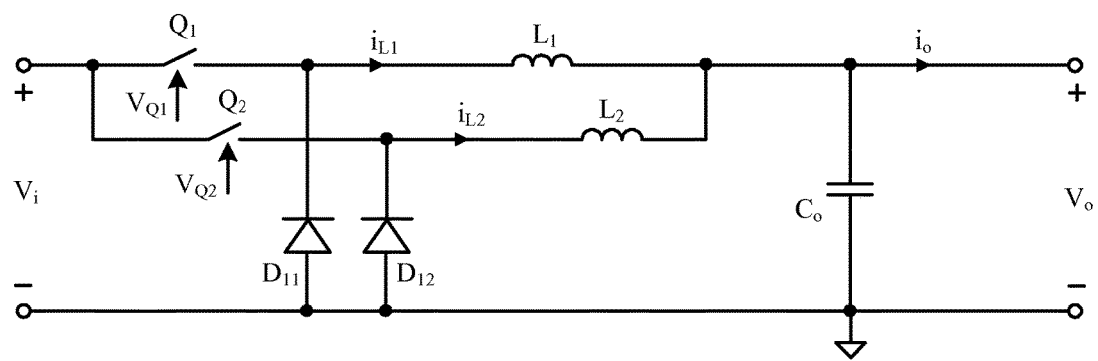
FIG. 1 is a schematic block diagram of an example interleaved switching power supply.

Main circuits of a switching power supply can be coupled in an "interleaved" fashion, and in parallel to decrease the burden of the power switches, to improve the power density of the power supply, and to decrease the ripple of the output voltage of the switching power supply in order to maintain a higher quality of output voltage. FIG. 1 shows an example of an interleaved switching power supply. In this example, the main circuit configuration can include two phase buck circuits coupled interleaved and in parallel, and the interleaved switching power supply can include a first voltage regulator, a second voltage regulator, and an output capacitor $C_o$. The first voltage regulator can include main power switch (e.g., a power transistor) $Q_1$, inductor $L_1$, and free-wheeling diode $D_{11}$. The second voltage regulator can include main power switch (e.g., a power transistor) $Q_2$, inductor $L_2$, and free-wheeling diode $D_{12}$. Main power switches $Q_1$ and $Q_2$ can connect to the positive electrode of input supply $V_i$, and to inductors $L_1$ and $L_2$, respectively.

Other terminals of inductor $L_1$ and inductor $L_2$ can connect to each other. For example, a first terminal of free-wheeling diode $D_{11}$ can connect to a second terminal of main power switch $Q_1$. A first terminal of free-wheeling diode $D_{12}$ can connect to a second terminal of main power switch $Q_2$. The second terminals of free-wheeling diodes $D_{11}$ and $D_{12}$ can both connect to the negative electrode of input supply $V_i$. Output capacitor $C_o$ can connect to the second terminals of inductor $L_1$ and inductor $L_2$, and to ground. The positive electrode and negative electrode of output capacitor $C_o$ can be configured as the positive electrode and negative electrode of the output terminals of the interleaved switching power supply.

In operation of the interleaved switching power supply, the conduction phase of main power switch $Q_2$ may lag that of main power switch $Q_1$ by about 180°. Thus, currents $i_{L1}$ and $i_{L2}$ can be generated, and ripple waves of current $i_{L1}$, and $i_{L2}$ can be counteracted to decrease the current ripple of output current $i_o$. However, the frequency may be increased by, e.g., two times the original frequency, and the voltage ripple of output voltage $V_o$ may also be decreased. Therefore, the values of inductor $L_1$, inductor $L_2$, and output capacitor $C_o$ can be decreased to improve the dynamic response. For example, each buck circuit may only afford half of the output power, and current flowing through inductors $L_1$ and $L_2$, and power switches $Q_1$ and $Q_2$ may be only half of that of regular buck circuit. Also, in high frequency working conditions, ceramic capacitors of lower equivalent resistance can be utilized as output capacitor $C_o$ to maintain the output of the switching power supply as steadier and with higher efficiency.

Phase difference control of an interleaved switching power supply can be achieved when constant frequency control is employed. For typical switching power supplies, improved dynamic response performance and simplified compensation design can be found via a constant time control mode. However, when a constant on time control mode is used in interleaved switching power supplies, interleaved parallel control of the two voltage regulators may be difficult to achieve due to the variable operation frequency.

In particular embodiments, a control circuit for an interleaved switching power supply can obtain an output voltage of the interleaved switching power supply by a feedback compensation signal generating circuit, and may output an feedback compensation signal (e.g., via calculation and compensation). A voltage signal indicative of the inductor current in a first voltage regulation circuit via a first switch control circuit can be compared against the feedback compensation signal. When the voltage signal equals a level of the feedback compensation signal, the first switch control circuit can control a first main power switch in the first voltage regulation circuit to be turned on. The first main power switch may be turned off after a predetermined time has elapsed.

After half of a switching cycle since the first main power switch is turned on, a second switch control circuit can control a second main power switch in a second voltage regulation circuit to be turned on. For example, a "switching cycle" may be a cycle corresponding to completion of an entire switching operation of the first main power switch. Also, inductor current average values of inductor currents in the two voltage regulation circuits may be compared, and when the inductor current average values are not equal, an on time of the second main power switch may be adjusted (e.g., increased or decreased), and the second main power switch may be turned off. In this way, inductor current average values may become equal to each other by regulating the on time of the second main power switch for several times (e.g., over a number of cycles). Thus, the two voltage regulation circuits may be turned on with a 180° phase-difference, and with equal on times. Accordingly, interleaved control between the two voltage regulation circuits when constant on time control is utilized in an interleaved switching power supply can be achieved, for improved dynamic response.

In one embodiment, a control circuit configured for an interleaved switching power supply, can include: (i) a feedback compensation signal generation circuit configured to sample an output voltage of the interleaved switching power supply, and to generate a feedback compensation signal; (ii) a first switch control circuit configured to compare a voltage signal indicative of an inductor current in the first voltage regulation circuit against the feedback compensation signal, and to turn on a first main power switch in the first voltage regulation circuit, and then to turn off the first main power switch after a predetermined time, in response to the voltage signal being equal to the feedback compensation signal; and (iii) a second switch control circuit configured to turn on a second main power switch in the second voltage regulation circuit after half of a switching cycle after the first main power switch is turned on, and to regulate an on time of the second main power switch in response to a comparison of inductor current average values of inductor currents of the two voltage regulation circuits in the switching cycle.

Figure 2:
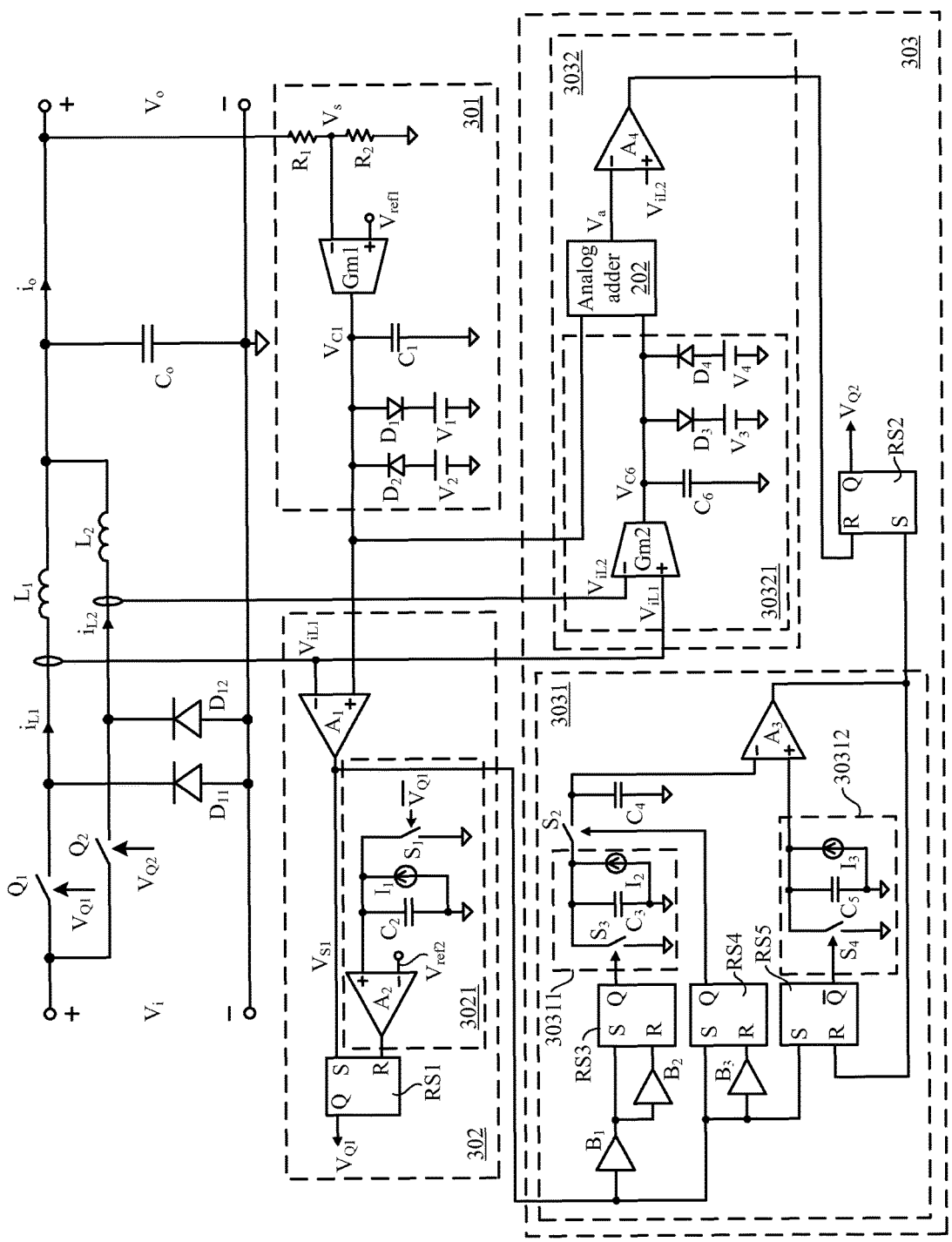
FIG. 2 is a schematic block diagram of an example control circuit for an interleaved switching power supply, in accordance with embodiments of the present invention.

Referring now to FIG. 2, shown is a schematic block diagram of an example control circuit for an interleaved switching power supply, in accordance with embodiments of the present invention. In this particular example, the interleaved switching power supply can include a first voltage regulation circuit and a second voltage regulation circuit, which are "interleaved" and/or coupled in parallel. Here, the two voltage regulation circuits are both buck circuits; however, any suitable converter topology (e.g., boost, flyback, buck-boost, SEPIC, etc.) can be accommodated in particular embodiments. The interleaved switching power supply can include an input terminal for receiving input power supply $v_i$ and may be configured to increase or decrease the voltage of input power supply $v_i$. Also, a DC voltage (e.g., with a higher quality or stability) at an output terminal of the interleaved switching power supply, can be provided.

This example control circuit can include feedback compensation signal generation circuit 301, which can sample output voltage $V_o$ at an output terminal of the interleaved switching power supply, in order to generate feedback compensation signal $V_{C1}$ (e.g., by calculating and/or compensating). Switch control circuit 302 can receive a voltage signal (e.g., branch voltage signal $V_{iL1}$) representing the inductor current of the first voltage regulator. Branch voltage signal $V_{iL1}$ may be compared against feedback compensation signal $V_{C1}$. When branch voltage signal $V_{iL1}$ is consistent with (e.g., the same or substantially the same value as) feedback compensation signal $V_{C1}$, main power switch $Q_1$ of the first voltage regulator may be controlled to be on for a predetermined time by switch control circuit 302, and then main power switch $Q_1$ can be turned off.

Switch control circuit 303 can control main power switch $Q_2$ in the second voltage regulation circuit to be turned on half of a switching cycle after main switch $Q_1$ is turned on. A switching cycle may be a time or cycle for completion of an entire switching operation of main power switch $Q_1$. In addition, inductor current average values of the inductor currents of the two voltage regulation circuits in a switching cycle can be compared. In response, an on time of main power switch $Q_2$ can be adjusted (e.g., increased or decreased) when these inductor current average values are not equal. Further, main power switch $Q_2$ can be controlled to be turned off so as to match the inductor current average values with each other by repeatedly regulating the on time of main power switch $Q_2$.

Switch control circuit 302 can include comparator $A_1$, flip-flop RS1, and off signal generation circuit 3021. The non-inverting input terminal of comparator $A_1$ can receive feedback compensation signal $V_{C1}$, and the inverting input terminal of comparator $A_1$ can receive branch voltage signal $V_{iL1}$ of the first voltage regulation circuit. Switch on signal $V_{S1}$ may be generated at the output terminals of comparator $A_1$, and may be provided to the set terminal (S) of RS flip-flop RS1. Off signal generation circuit 3021 can receive the control signal (e.g., $V_{Q1}$) of main power switch $Q_1$. When $V_{Q1}$ is active (e.g., logic high), off signal generation circuit 3021 can begin operation. After the predetermined time has elapsed, a first switch off signal may be provided to the reset terminal (R) of RS flip-flop RS1 to control the on time of main power switch $Q_1$ to be substantially the predetermined time.

The output terminal (Q) of flip-flop RS1 can generate $V_{Q1}$. When switch on signal $V_{S1}$ is active, flip-flop RS1 may be set, and the control signal (e.g., $V_{Q1}$) of main power switch $Q_1$ therefrom may be activated to turn on main power switch $Q_1$. When the first switch off signal is inactive, flip-flop RS1 may be reset, and control signal $V_{Q1}$ may be inactive to turn off main power switch $Q_1$. Further, off signal generation circuit 3021 can include comparator $A_2$, capacitor $C_2$, current source $I_1$, and switch (e.g., transistor) $S_1$. Switch $S_1$, current source $I_1$ and capacitor $C_2$ can be coupled in parallel, with common notes connecting to the non-inverting input terminal of comparator $A_3$, and to ground. Operation of switch $S_1$ may be controlled by control signal $V_{Q1}$, or an inverted version thereof. When control signal $V_{Q1}$ is active, main power switch $Q_1$ may be on, and capacitor $C_1$ may be charged by current source $I_1$. When control signal $V_{Q1}$ is inactive, main power switch $Q_1$ may be turned off, and the voltage across capacitor $C_1$ may be discharged to ground.

The inverting input terminal of comparator $A_2$ can receive reference voltage $V_{ref2}$. When the voltage across capacitor $C_2$ is charged to be consistent with (e.g., substantially a same level as) reference voltage $V_{ref2}$, the first switch off signal may be activated at the output of comparator $A_2$. For example, switch control circuit 303 can include phase-difference control circuit 3031, off signal generating circuit 3032, and RS flip-flop RS2. Phase difference control circuit 3031 can receive switch on signal $V_{S1}$. When switch on signal $V_{S1}$ is active, control signal $V_{Q1}$ can be active, and main power switch $Q_1$ may be turned on. A second switch on signal may be generated (e.g., and supplied to a set terminal of RS flip-flop RS2) a half switching cycle after main power switch $Q_1$ was turned on.

Off signal generating circuit 3032 can compare inductor current average values of inductor currents $i_{L1}$ and $i_{L2}$ of the two voltage regulation circuits in a (e.g., in each) switching cycle, and may regulate a time for activation of the second switch off signal supplied to a reset terminal of RS flip-flop RS2 via off signal generating circuit 3032. In this way, the inductor current average values may be equal to each other after a number (e.g., several) of regulation cycles or iterations. RS flip-flop RS2 may generate a control signal of main switch $Q_2$ (e.g., $V_{Q2}$). When the second switch on signal is active, RS flip-flop RS2 may be set, and control signal $V_{Q2}$ may be activated (e.g., go high) to turn on main switch $Q_2$. When the second switch off signal is active, RS flip-flop RS2 may be reset, and control signal $V_{Q2}$ may be inactive (e.g., low) to turn off main power switch $Q_2$.

Phase-difference control circuit 3031 can include buffers $B_1$, $B_2$, $B_3$, RS flip-flops RS3, RS4, RS5, charging circuits 30311 and 30312, switch $S_2$, sense capacitor $C_4$, and comparator $A_3$. Buffer $B_1$ may have an input terminal coupled to an output terminal of comparator $A_1$, and an output terminal coupled to a set terminal of RS flip-flop RS3. Buffer $B_2$ may have an input terminal coupled to the output terminal of buffer $B_1$, and an output terminal coupled to a reset terminal of RS flip-flop RS3. For example, a first control signal may be generated at an output terminal of RS flip-flop RS3, to control charging circuit 30311.

Buffer $B_3$ may have an input terminal coupled to the output terminal of comparator $A_1$, and an output terminal coupled to a reset terminal of RS flip-flop RS4. RS flip-flop RS4 may have a set terminal coupled to the output terminal of comparator $A_1$, and a switch control signal for switch $S_2$ may be generated at an output terminal of RS flip-flop RS4. Buffer RS5 may have a set terminal coupled to the output terminal of comparator $A_1$, and a reset terminal coupled to the output terminal of comparator $A_3$. A second control signal for charging circuit 30312 may be generated at a complementary output terminal of RS flip-flop RS5.

Circuit 30311 can receive the first control signal, and when the first control signal is deactivated, capacitor $C_3$ can be charged. For example, a charging time for charging an output voltage of capacitor $C_3$ to a maximum output voltage via charging circuit 30311 may equal a switching cycle of main power switch $Q_1$. Sense capacitor $C_4$ can connect to an inverting input terminal of comparator $A_3$, and to ground. Switch $S_2$ can connect between an output terminal of charging circuit 30311 and sense capacitor $C_4$. The switch control signal output from RS flip-flop RS4 can control switch $S_2$. When the switch control signal is active, switch $S_2$ may be on, and the voltage across sense capacitor $S_2$ can equal a maximum output voltage of charging circuit 30311. When the switch control signal is inactive, switch $S_2$ may be off, and the voltage across sense capacitor $C_4$ may be maintained to be about the maximum output voltage of charging circuit 30311.

Charging circuit 30312 can receive the second control signal, and when the second control signal is deactivated, capacitor $C_5$ can be charged. For example, maximum output voltages of charging circuits 30311 and 30312 may be equal. Also, a charging time for charging the output voltage to a level of the maximum output voltage via charging circuit 30312 may be half that of charging circuit 30311 (e.g., $C_3=2C_5$). Capacitor $C_5$ can connect to a non-inverting input terminal of comparator $A_3$. When the voltage across capacitor $C_5$ equals a level of the voltage across sense capacitor $C_4$, a second switch on signal may be activated by comparator $A_3$. This second switch on signal can be provided to a set terminal of RS flip-flop RS2. Charging circuit 30311 can include current source $I_2$, switch $S_3$ and capacitor $C_3$. Switch $S_3$ can be controlled by the first control signal. Also, current source $I_2$, switch $S_3$, and capacitor $C_3$ may be coupled in parallel between switch $S_2$ and ground. Charging circuit 30312 can include current source $I_3$, switch $S_4$, and capacitor $C_5$. Switch $S_4$ can be controlled by the second control signal. Current source $I_3$, switch $S_4$, and capacitor $C_5$ can be coupled in parallel between the non-inverting input terminal of comparator $A_3$ and ground.

Off signal generating circuit 3032 can include current balancing circuit 30321, analog adder 202, and comparator $A_4$. For example, current balancing circuit 30321 can compare inductor current average values of inductor currents $i_{L1}$ and $i_{L2}$ over a switching cycle, and may output compensation voltage signal $V_{C6}$ indicative of a difference between the inductor current average values. Analog adder 202 can receive feedback compensation signal $V_{C1}$ and compensation voltage signal $V_{C6}$, and compensation reference signal $V_a$ generated at an output of analog adder 202 can be provided to an inverting input terminal of comparator $A_4$. Comparator $A_4$ may receive a voltage signal (e.g., branch voltage signal $V_{iL2}$) indicative of the inductor current in the second voltage regulation circuit at a non-inverting terminal, and compensation reference signal $V_a$ at an inverting terminal. The second switch off signal may be generated at an output terminal of comparator $A_4$, and may be provided to a reset terminal of RS flip-flop RS2.

Current balancing circuit 30321 can include transconductance operational amplifier Gm2 and compensation capacitor $C_6$. Transconductance amplifier Gm2 may receive branch voltage signals $V_{iL1}$ and $V_{iL2}$, which can be indicative of the inductor currents in the first and second voltage regulation circuits. Compensation capacitor $C_6$ can connect between an output terminal of transconductance operational amplifier Gm2 and ground, and a voltage across compensation capacitor $C_6$ may be compensation voltage signal $V_{C6}$.

Current balancing circuit 30321 also can include up-clamp and down-clamp circuits coupled to the output terminal of transconductance operational amplifier Gm2. The up-clamp and down-clamp circuits can be utilised to avoid amplitude differences between branch voltage signals $V_{iL1}$ and $V_{iL2}$ that may be too large for a given application. For example, the down-clamp circuit can include diode $D_3$ and power supply $V_3$ connected in series, and may be configured to limit the circuit voltage to be no higher than $U_{v3}+U_{D3}$ (e.g., $V_3$ plus a diode drop across $D_3$). An anode of diode $D_3$ can connect to an output terminal of transconductance operational amplifier Gm2, an anode of power supply $V_3$ can connect to a cathode of diode $D_3$, and a cathode of power supply $V_3$ can connect to ground. For example, the up-clamp circuit can include diode $D_4$ and power supply $V_4$ connected in series, and may be configured to limit the circuit voltage to be no lower than $U_{v4}-U_{D4}$ (e.g., $V_4$ minus a diode drop across $D_4$). A cathode of diode $D_4$ may be coupled to an output terminal of transconductance operational amplifier $G_{m2}$, an anode of power supply $V_4$ may be coupled to an anode of diode $D_4$, and a cathode of power supply $V_4$ can connect to ground.

Feedback compensation signal generating circuit 301 can include transconductance operational amplifier Gm1, compensation capacitor $C_1$, sampling resistors $R_1$ and $R_2$. Sampling resistor $R_1$ may be coupled to an output terminal of the interleaved switching power supply, and to an inverting input terminal of transconductance operational amplifier Gm1. Sampling resistor $R_2$ can connect to the inverting input terminal of transconductance operational amplifier Gm1, and to ground. The non-inverting input terminal of transconductance operational amplifier Gm1 can receive reference voltage $V_{ref1}$. Current output from transconductance amplifier Gm1 can be used to charge compensation capacitor $C_1$, in order to generate feedback compensation signal $V_{C1}$. For example, feedback compensation signal generating circuit 301 also can include up-clamp and down-clamp circuits coupled to the output terminal of transconductance operational amplifier Gm1 for controlling the variation range of feedback compensation signal $V_{C1}$.

For example, the down-clamp circuit can include diode $D_1$ and power supply $V_1$ connected in series. An anode of diode $D_1$ can connect to an output terminal of transconductance operational amplifier Gm1, an anode of power supply $V_1$ can connect to a cathode of diode $D_1$, and a cathode of power supply $V_1$ can connect to ground. The down-clamp circuit may be configured to limit the circuit voltage to be no higher than $U_{v1}+U_{D1}$. For example, the up-clamp circuit can include diode $D_2$ and power supply $V_2$ connected in series. A cathode of diode $D_2$ can connect to an output terminal of transconductance operational amplifier Gm1, an anode of power supply $V_2$ can connect to an anode of diode $D_2$, and a cathode of power supply $V_2$ can connect to ground. The up-clamp circuit may be configured to limit the circuit voltage to be no less than $U_{v2}-U_{D2}$.

The interleaved switching power supply can include a first voltage regulation circuit, a second voltage regulation circuit, and output capacitor $C_o$. The first voltage regulation circuit can include main power switch $Q_1$, inductor $L_1$, and free-wheeling diode $D_{11}$. The second voltage regulation circuit can include main power switch $Q_2$, inductor $L_2$, and free-wheeling diode $D_{12}$. Main power switches $Q_1$ and $Q_2$ can connect to a positive electrode of an input power supply, and inductors $L_1$ and $L_2$ can connect terminals of main power switches $Q_1$ and $Q_2$, and to each other. Diode $D_{11}$ can connect main power switch $Q_1$ and to the negative electrode of the input supply. Diode $D_{12}$ can connect to main power switch $Q_2$ and to the negative electrode of the input supply. Capacitor $C_o$ can connect to a common node of inductors $L_1$ and $L_2$, and to the negative electrode of the input supply (e.g., ground). The positive and negative electrodes of output capacitor $C_o$ may be configured as corresponding positive and negative electrodes of the interleaved switching power supply.

Feedback compensation signal generating circuit 301 can receive feedback signal $V_s$ indicative of output voltage $V_o$, and may generate feedback compensation signal $V_{C1}$ after being compensated by transconductance operational amplifier Gm1 and compensation capacitor $C_1$. Comparator $A_1$ in switch control circuit 302 may receive branch voltage signal $V_{iL1}$ indicative of the inductor current of the first voltage regulation circuit, and feedback compensation signal $V_{C1}$. When a valley value (e.g., a minimum or low value) of voltage signal $V_{iL1}$ reaches a level of feedback compensation signal $V_{C1}$, comparator $A_1$ can output a high level. As a result, RS flip-flop RS1 can activate $V_{Q1}$ to turn on main power switch $Q_1$. Also, switch $S_1$ may be controlled by an inverted version of control signal $V_{Q1}$, so switch $S_1$ may be off.

Current source $I_1$ can charge capacitor $C_2$, and when the voltage across capacitor $C_2$ is charged to a level of reference voltage $V_{ref2}$, comparator $A_2$ can output a high level. As a result, RS flip-flop RS1 may be reset, and output signal $V_{Q1}$ may go low to turn off main power switch $Q_1$. Therefore, the on time of main power switch $Q_1$ in the first voltage regulation circuit may be determined by current source $I_1$, capacitor $C_2$, and reference voltage $V_{ref2}$. Thus, when these values are fixed, the on time of main power switch $Q_1$ may be also fixed.

Buffers $B_1$, $B_2$, and $B_3$ may be time delay circuits or buffers to guarantee that RS flip-flops can be triggered sequentially, for normal operation of switch control circuit 303. Because of the timing due to buffers $B_1$, $B_2$ and $B_3$, RS flip-flop RS5 can be controlled initially, followed by RS flip-flop RS4, and then by RS flip-flop RS3. When main power switch $Q_1$ is turned off, comparator $A_1$ can output a low level, and RS flip-flop RS5 may provide a high level at its complementary output terminal. As a result, switch $S_4$ may be turned on, and the voltage across capacitor $C_5$ may be discharged to zero. RS flip-flop RS4 can output a low level, and switch $S_2$ can be turned off as a result. RS flip-flop RS3 can output a low level to turn off switch $S_3$, and current source $I_2$ can charge capacitor $C_3$ until the voltage across $C_3$ reaches a maximum output voltage. For example, the maximum output voltage may be in direct proportion with the switching cycle, and the charging time via charging circuit 30311 may equal a switching cycle of main power switch $Q_1$.

When charging is completed, main power switch $Q_1$ may be turned on, comparator $A_1$ can output a high level, RS flip-flop RS4 can output a high level, and switch $S_2$ may be turned on. The maximum output voltage of capacitor $C_3$ may be sampled by sense capacitor $C_4$, and then switch $S_2$ may be turned off. This voltage across sense capacitor $C_4$ may be maintained by sense capacitor $C_4$. RS flip-flop RS5 can output a low level at its complementary output terminal, switch $S_4$ may be turned off, and current source $I_3$ may charge capacitor $C_5$. For example, if $C_3=2C_5$ or $I_2=2I_3$, the speed of voltage increase across capacitor $C_5$ may be two times of that of capacitor $C_3$.

Also, the maximum output voltage of capacitor $C_5$ can be equal to that of capacitor $C_3$, thus a half switching cycle after main power switch $Q_1$ is turned on, the maximum output voltage of capacitor $C_5$ may equal the voltage across sense capacitor $C_4$, comparator $A_3$ may output high level, signal $V_{Q2}$ from RS flip-flop RS2 may go high, and main power switch $Q_2$ may be turned on. Therefore, the turning on time of main power switch $Q_2$ may be a half switching cycle that lags that of main power switch $Q_1$. In other words, the phase-difference between the turn on times of main power switches $Q_1$ and $Q_2$ may be 180°, to realize interleaved control of the two voltage regulation circuits.

Current balancing circuit 30321 can receive branch voltage signals $V_{iL1}$ and $V_{iL2}$, and may generate a current signal indicative of a difference between averages of $i_{L1}$ and $i_{L2}$ in a switching cycle. The current signal generated by transconductance amplifier Gm2 may charge compensation capacitor $C_6$ to obtain compensation voltage signal $V_{C6}$. In a switching cycle, when the average value of $i_{L1}$ is greater than that of $i_{L2}$, compensation voltage signal $V_{C6}$ from Gm2 can increase, thus compensation reference voltage $V_a$ can increase, and comparator $A_4$ can output a low level. Main power switch $Q_2$ can remain on, and a peak value of branch voltage signal $V_{iL2}$ with reference to compensation reference voltage $V_a$ may also increase. When $V_{iL2}$ increases to $V_a$, the output of comparator $A_4$ may go high, and main power switch $Q_2$ may be turned off. When the circuit is stable after closed-loop regulation, average values of inductor currents $i_{L1}$ and $i_{L2}$ may be equal, and as a result, the on times of the two voltage regulation circuits may also be equal.

Similarly, in a switching cycle, when the average value of $i_{L1}$ is less than that of $i_{L2}$, compensation voltage signal $V_{C6}$ obtained via Gm2 may decrease. As a result, compensation reference voltage $V_a$ may decrease, and a peak value of branch voltage signal $V_{iL2}$ with reference to compensation reference voltage $V_a$ may be reached in advance. Thus, an average value of $i_{L2}$ may be reduced, and when $V_{iL2}$ reaches $V_a$, the output of comparator $A_4$ can high, resulting in main power switch $Q_2$ being turned off. When the circuit is stable after closed-loop regulation, average values of inductor currents $i_{L1}$ and $i_{L2}$ may be equal, and as a result, the on times of the two voltage regulation circuits may also be equal.

In this fashion, the first voltage regulation circuit may operate in a valley value current control mode with a fixed on time, and the second voltage regulation circuit may operate in a peak current control mode. The on time of the second voltage regulation circuit may be determined by the first voltage regulation circuit, with its phase lagging by 180° to that of the first voltage regulation circuit when main power switch $Q_1$ is turned on. However, as the on time of main switch $Q_2$ in the second voltage regulation circuit may be not fixed, during a dynamic procedure, the two voltage regulation circuit may operate together to achieve current balancing, resulting in improved dynamic response relative to such voltage regulation circuits having fixed on times.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A control circuit configured for an interleaved switching power supply having first and second voltage regulation circuits coupled in parallel, the control circuit comprising:
   a) a feedback compensation signal generation circuit configured to generate a feedback compensation signal based on an error between an output voltage of said interleaved switching power supply and a first reference voltage;
   b) a first switch control circuit configured to compare a voltage signal indicative of an inductor current in said first voltage regulation circuit against said feedback compensation signal, to turn on a first main power switch in said first voltage regulation circuit when a valley value of said voltage signal reaches said feedback compensation signal, and then to turn off said first main power switch after a predetermined time during which a first capacitor is charged to a second reference voltage in order to control said first voltage regulation circuit to operate in a valley value current control mode with a fixed on time; and
   c) a second switch control circuit configured to turn on a second main power switch in said second voltage regulation circuit after half of a switching cycle after said first main power switch is turned on, and to regulate an on time of said second main power switch in response to an error of inductor current average values of inductor currents of said first and second voltage regulation circuits in said switching cycle and a peak value of a second voltage signal indicative of a second inductor current in said second voltage regulation circuit, in order to control said second voltage regulation circuit to operate in a peak current control mode.

2. The control circuit of claim 1, wherein said first switch control circuit comprises:
   a) a first comparator configured to generate a first switch on signal in response to a comparison of said voltage signal against said feedback compensation signal;
   b) a first off signal generating circuit configured to operate when a control signal of said first main power switch is active, and to generate a first switch off signal to control said on time of said first main power switch to be a predetermined time; and
   c) a first RS flip-flop configured to activate said control signal of said first main power switch to turn on said first main power switch when said first switch on signal is active, and to deactivate said control signal of said first main power switch to turn off said first main power switch when said first switch off signal is active.

3. The control circuit of claim 2, wherein said first off signal generating circuit comprises:
   a) a first switch, a first current source, and a first capacitor coupled in parallel between a non-inverting input terminal of a second comparator and ground;
   b) said first switch being controlled by said control signal of said first main power switch such that said first current source charges said first capacitor when said control signal of said first main power switch is active, and said first capacitor is discharged when said control signal of said first main power switch is inactive; and
   c) said second comparator being configured to said first switch off signal when said voltage across said first capacitor is charged to said second reference voltage.

4. The control circuit of claim 2, wherein said second switch control circuit comprises:
   a) a phase-difference control circuit configured to receive said first switch on signal, and to generate a second switch on signal after said half of said switching cycle after said first main power switch is turned on, wherein said switching cycle comprises a full switching operation of said first main power switch;
   b) a second off signal generating circuit configured to compare said inductor current average values of said inductor currents of said first and second voltage regulation circuits in said switching cycle, and to regulate a generation time of said second switch off signal; and
   c) a second RS flip-flop configured to generate a control signal of said second main power switch in response to said second switch on signal and said second switch off signal.

5. The control circuit of claim 4, wherein said phase-difference control circuit comprises:
   a) a first buffer coupled to said first comparator, and to a set terminal of a third RS flip-flop, a second buffer coupled to said first buffer, and to a reset terminal of said third RS flip-flop, wherein said third RS flip-flop is configured to generate a first control signal;
b) a third buffer coupled to said first comparator, and to a reset terminal of a fourth RS flip-flop, said fourth RS flip-flop having a set terminal coupled to said first buffer, wherein said fourth RS flip-flop is configured to generate a switch control signal;
c) a fifth RS flip-flop having a set terminal coupled to said first comparator, and a reset terminal coupled to an output of a third comparator, wherein said fifth RS flip-flop is configured to generate a second control signal at a complementary output terminal;
d) a first charging circuit configured to charge a second capacitor of a first charging circuit when said first control signal is inactive;
e) a sense capacitor coupled to said third comparator and ground, wherein said second switch is coupled between said first charging circuit and said sense capacitor, said switch control signal being configured to control said second switch;
f) a second charging circuit configured to charge said third capacitor in said second charging circuit when said second control signal is inactive; and
g) said third comparator being configured to generate a second switch on signal when said voltage across said third capacitor equals a level of a voltage across said sense capacitor.

6. The control circuit of claim 5, wherein said first charging circuit comprises a third switch controllable by said first control signal, a second current source, and a second capacitor coupled in parallel between said second switch and ground.

7. The control circuit of claim 5, wherein said second charging circuit comprises a fourth switch controllable by said second control signal, a third current source, and a third capacitor coupled in parallel between a non-inverting input terminal of said third comparator and ground.

8. The control circuit of claim 4, wherein said second off signal generating circuit comprises:
a) a current balancing circuit configured to compare said inductor current average values of said inductor currents of said first and second voltage regulation circuits, and to generate a compensation voltage signal;
b) an analog adder configured to receive said feedback compensation signal and said compensation voltage signal, and to generate a compensation reference signal; and
c) a fourth comparator configured to receive a voltage signal indicative of said inductor current in said second voltage regulation circuit and said compensation reference signal, and to generate a second switch off signal.

9. The control circuit of claim 8, wherein said current balancing circuit comprises:

a) a second transconductance amplifier configured to receive said voltage signals indicative of said inductor currents in said first and second voltage regulation circuits; and
b) a second compensation capacitor coupled between an output of said second transconductance operational amplifier and ground, wherein a voltage across said second compensation capacitor is configured as said compensation voltage signal.

10. The control circuit of claim 1, wherein said feedback compensation signal generating circuit comprises:
a) a sampling circuit configured to sense said output voltage of said interleaved switching power supply, and to generate a voltage sense signal;
b) a first transconductance operational amplifier configured to receive said first reference voltage, and said voltage sense signal; and
c) a first compensation capacitor coupled between an output of said first transconductance operational amplifier and ground, wherein a voltage across said first compensation capacitor is configured as said feedback compensation signal.

11. The control circuit of claim 1, further comprising a delay circuit configured to generate said predetermined time in response to activation of said first main power switch.

12. The control circuit of claim 1, wherein said second switch control circuit comprises an analog adder configured to regulate said on time of said second main power switch.

13. The control circuit of claim 1, wherein said second switch control circuit comprises an RS flip-flop having a set terminal coupled to an output of a first comparator, and a reset terminal coupled to an output of a second comparator, wherein said RS flip-flop is configured to activate said second main power switch in response to a voltage across a first capacitor equaling a level of a voltage across a second capacitor.

14. The control circuit of claim 1, wherein said feedback compensation generation circuit comprises an up-clamp circuit and a down-clamp circuit configured to limit the variation range of the feedback compensation signal.

15. The control circuit of claim 14, wherein:
a) said up-clamp circuit comprises a first diode having a cathode coupled to said feedback compensation signal; and
b) said down-clamp circuit comprises a second diode having an anode coupled to said feedback compensation signal.

16. The control circuit of claim 15, wherein:
a) said cathode of said first diode is directly connected to said feedback compensation signal; and
b) said anode of said second diode is directly connected to said feedback compensation signal.

17. The control circuit of claim 12, wherein said analog adder is directly connected to said feedback compensation signal.

* * * * *